Figure 3:
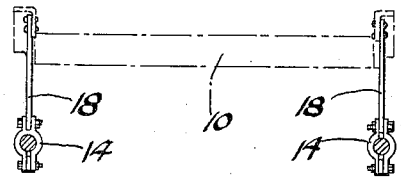

Oct. 25, 1938.   C. DRUDE   2,134,108
BUMPING EXTENSION
Filed Aug. 25, 1934   3 Sheets-Sheet 1
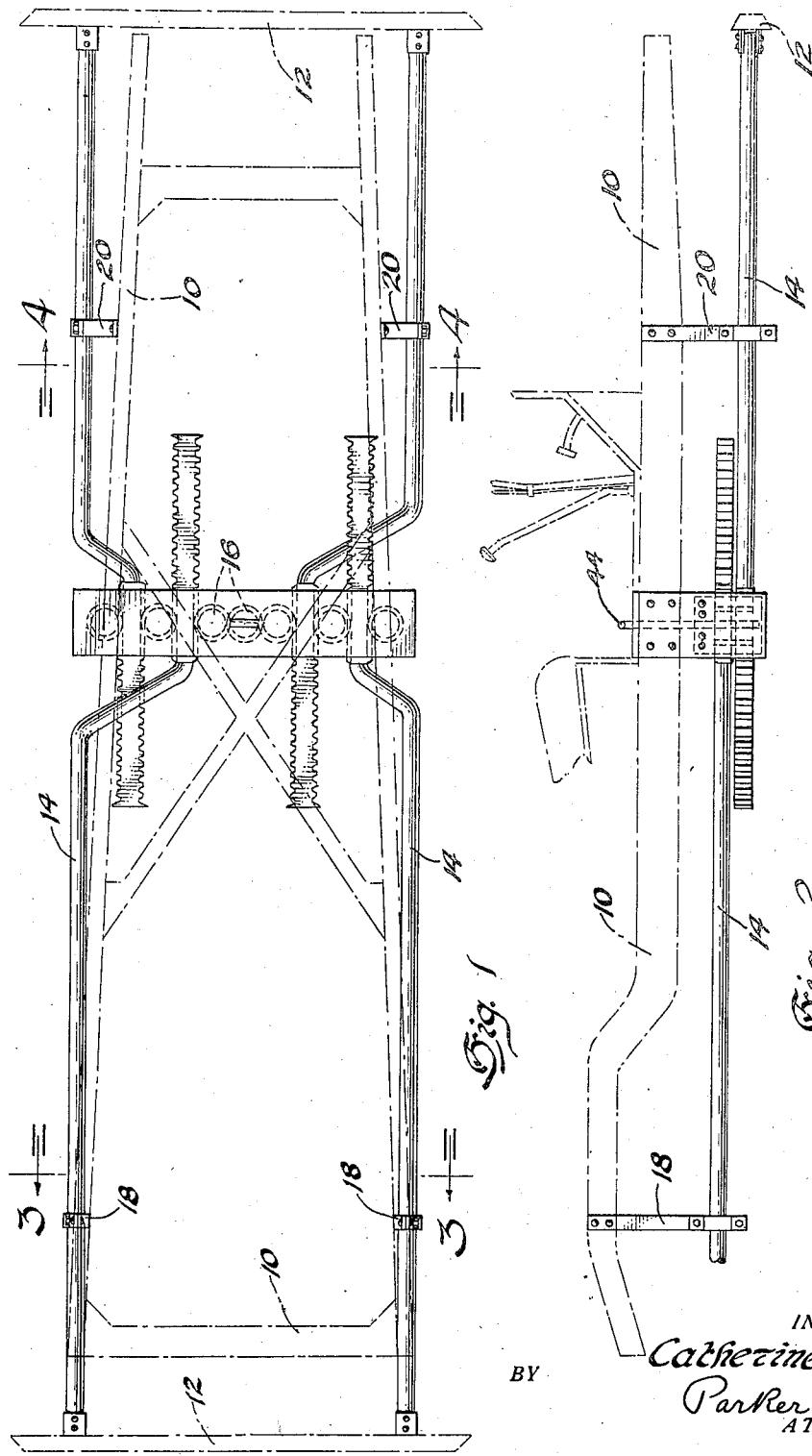
INVENTOR
Catherine Drude
BY Parker & Burton
ATTORNEYS.

Oct. 25, 1938.        C. DRUDE        2,134,108
BUMPING EXTENSION
Filed Aug. 25, 1934        3 Sheets-Sheet 2

INVENTOR
Catherine Drude
BY
Parker & Burton
ATTORNEYS

Oct. 25, 1938.                C. DRUDE                2,134,108
                          BUMPING EXTENSION
               Filed Aug. 25, 1934        3 Sheets-Sheet 3

INVENTOR
Catherine Drude
BY Parker & Burton
ATTORNEYS.

Patented Oct. 25, 1938

2,134,108

UNITED STATES PATENT OFFICE 2,134,108

BUMPING EXTENSION

Catherine Drude, Detroit, Mich.

Application August 25, 1934, Serial No. 741,361

17 Claims. (Cl. 293—26)

My invention relates to a new and useful extensible and retractible device, for bumping extensions to be used particularly in automobiles, passenger motor vehicles, or other vehicles; for the purpose of reserving parking space, protecting outer appearance, and preserving mechanism of vehicles, during parking period or other times, at anyplace or anywhere.

Bumping extensions may also be used for extending length, depth, height or for elevating, by installing the device in a way that bumping extension rods or rack bars point to any desired direction.

My said device may have platform, bumpers, ornamental rods, or any other useful idea mounted upon the bumping extension rods or bars for a bumping purpose.

Under present day traffic condition, automobiles and other types of vehicles are frequently parked closely behind one another either alongside of highway in a parking lot, or other places.

Conditions very frequently arise where it is extremely difficult, if not impossible, for a parked automobile to leave a parking space from between any two types of vehicles or other obstructions.

This results from the fact that most present day vehicles are equipped with four wheel brakes, and when brakes are locked the operator is bound to find it almost impossible to maneuver the vehicle from its parked position without some damage or even great damage to all vehicles involved. And delay under such circumstances are very annoying to the operator and the passengers of a vehicle, and the attempts to leave the parking space are likely to place considerable strain upon certain parts in a motor vehicle.

An important object of this invention is to provide a device which will insure sufficient space for the parked vehicle so that the vehicle may be driven from the parked position without difficulty.

A further object is to provide such a device which is capable of being locked in any adjusted position. In accomplishing these objects, I provide a manually operable and mechanically controllable, extensible and retractible device for either one or both ends of every type of motor or other vehicle. This provision enables any person to extend the length of every type of motor or other vehicle, thereby reserving additional space for maneuvering purposes when it is desired to leave the parking space.

A meritorious feature of this invention resides in the employment of my extensible and retractible bumping extension when installed in a vehicle for accomplishing these objects. The present day bumpers, bars, ornamental rods, or some other useful idea may be mounted upon the said extension rods or bars, for a bumping purpose, for extensible and retractible movement, and operating is provided in the interior of every type of motor vehicle to shift said extension rods or bars at the will of the operator.

Furthermore, the mechanism for shifting the bumping extensions is so arranged that upon pressing or setting the mechanical control all the way down in its key seat thereover the bumping extensions are automatically locked into any adjusted position.

Figure 4:
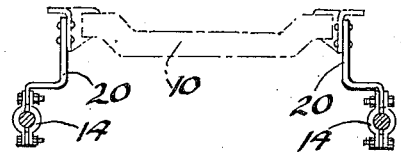
Figure 5:
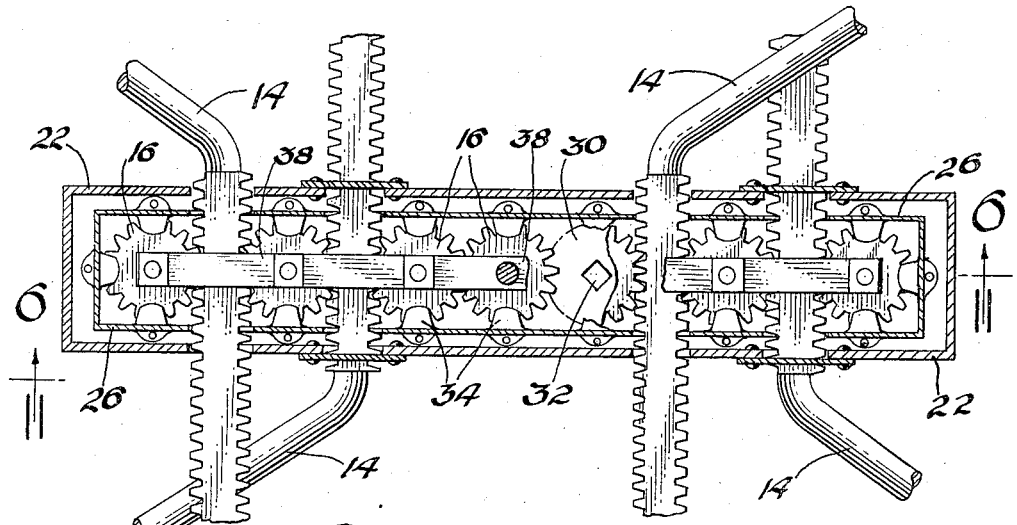
Figure 6:
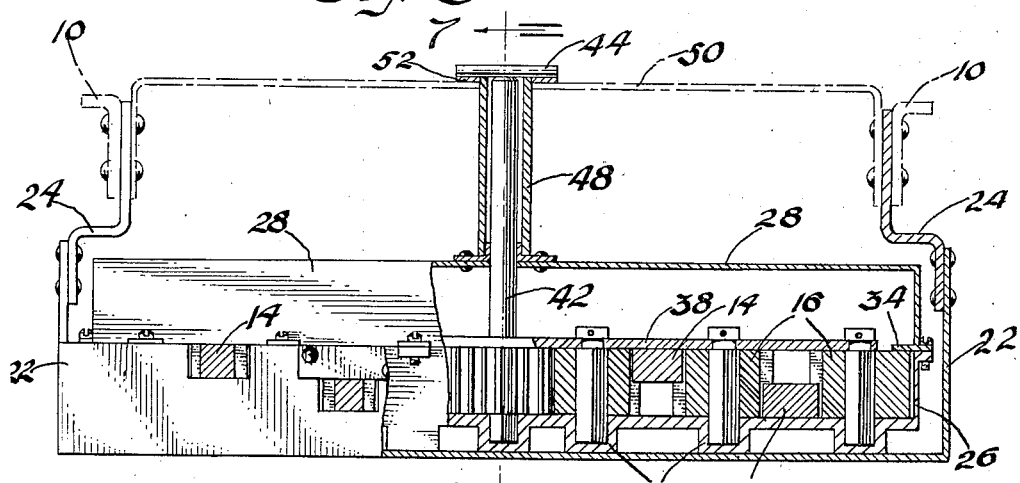
Figures 7, 8:
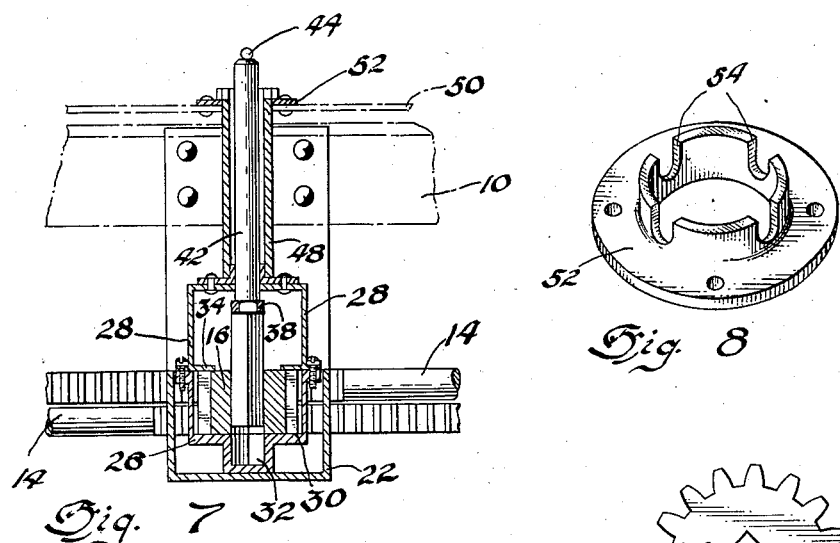
Figures 9, 10:
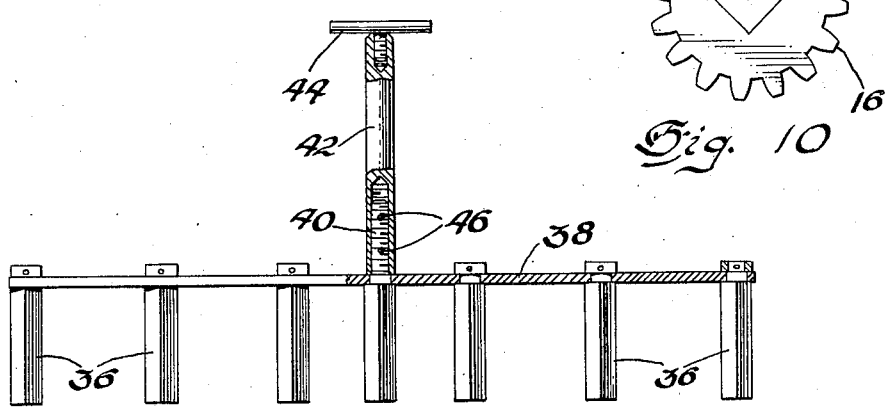
Figure 11:
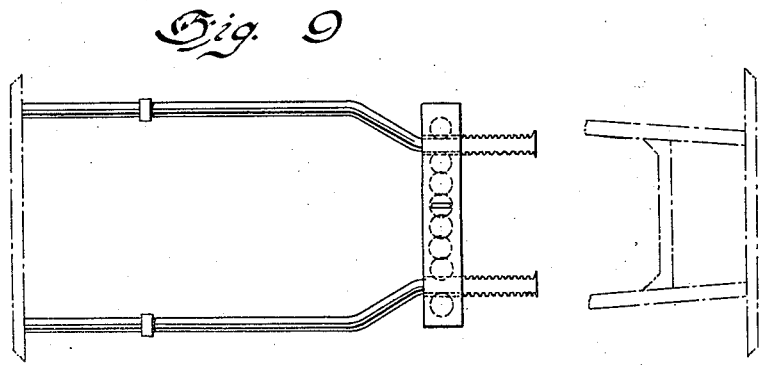

Various other objects, advantages, and important features of my invention will now fully appear from the following description of the illustrative embodiments described in the specification, defined in the claims and shown in the accompanying drawings, wherein;

Figure 1 is a top view showing the manner of connecting my extensible and retractible bumping extensions with respect to the chassis of a vehicle, Fig. 2 is a side view of the device shown in Fig. 1 showing the relation the extensible and retractible bumping extensions bear to the chassis of an automobile, Fig. 3 is a cross sectional view on line 3—3 in Fig. 1 showing a manner of supporting the rack bars or rods from the chassis, Fig. 4 is a cross sectional view on line 4—4 in Fig. 1 likewise showing a manner of supporting the rack bars or rods from the chassis, Fig. 5 is an enlarged sectional view of the gear mechanism for extending and retracting the bumping extensions, Fig. 6 is a sectional view along 6—6 in Fig. 5, Fig. 7 is a cross sectional view along 7—7 in Fig. 6, Fig. 8 is a detail view of the recessed collar into which the operating handle is capable of seating, Fig. 9 is a view of the operating mechanism showing the unitary character of the mechanical controller, Fig. 10 is a top view of one of the gear wheels, Fig. 11 is a modification showing the manner of providing the extensible and retractible bumping extension for either end of every type of motor vehicle. This is accomplished by having the front end of the so-called rack bar or bars, rod or rods pointing to either one or other end of vehicle. Please note, that the front end of rod or rack bar is the end that has a bumper bar or rod mounted upon for a bumping purpose.

With particular reference to the drawings, reference numeral 10 indicates a chassis of an automobile or passenger motor vehicle.

The extensible and retractible bumping extensions carry bumpers 12, bars, or any ornamental rods at either end of the automobile, passenger motor vehicle, or other vehicle. Each bumper 12, or in its place a bar or rod is secured to a bar or rod, or to a pair of bars or rods 14 extending externally from end of chassis, to casing or pan 22 as shown in Fig. 7 and interiorly through 22 and through gear wheel housing 26 long enough to obtain any desired length when extending the length of a vehicle.

The bars 14 are bent in order to reach a straight outer line, also to serve as stoppers as shown in Fig. 1 and rack teeth are provided to bends on one end of each bar or rack.

Extending transversely of the chassis and supported by means to be described hereinafter are a series of gear wheels 16 engaging with one another and the rack teeth on the bars 14 so that upon rotation of one of these gear wheels, all gear wheels rotate and shift the rack bar or bars, rod or rods, and in that way increase or decrease the length of the vehicle.

Steel straps 18 and 20 are provided at convenient places along the chassis for supporting the rack bars 14 therefrom, as best shown in Fig. 2.

With more particular reference to the remainder of the figures, 22 indicates a casing or pan which is connected to steel straps or brackets 24 and said brackets are connected and supported from the side members of the chassis, and the floor board bracket 50 for carrying the gear housing 26 which carries the series of gear wheels, as shown in Fig. 6.

The position of the gear wheel mechanism is preferably below the front or driver's compartment of an automobile, or passenger motor vehicle, as indicated in Fig. 2.

Carried within the casing 22 is a gear wheel housing 26 shaped to contain the gear wheels and provided with a top member or top portion 28 spaced from the top of the gear wheels.

The gear wheel housing 26 is provided in its base with circular gear wheel seats 30 in which the gear wheels are adapted to seat and rotate, as shown in the left portion of Fig. 5.

Centrally located within each of these gear wheel seats is a squared shaped key seat 32 which extends below the gear wheel seat, to provide the key member 36 as shown in Fig. 9 with additional depth below the gear wheel seat for locking and unlocking bumping extension.

In the housing 26 which rests upon the casing 22 the cover portion 28 is provided with lugs or ears 34, which are provided with interior portions extending over the gear wheels and locking the same in their seats as shown in Figs. 5 and 7. The outer portions of these ears rest upon corresponding outer ears on the housing 26 through which bolts extend to secure the two together as shown in Fig. 7.

Each gear wheel is provided with a square shaped central aperture as shown in Fig. 10.

These apertures correspond in size with the key seats or slots 32. Slidably inserted in each of these gear wheels is a square shaped key member 36. These members extend beyond the top of the gear wheels, and each is joined to the others into a unitary structure by a steel strip 38, as best shown in Fig. 9. Each member is rotatively and removably secured in the steel strip 38, which sits over the neck of the key members 36, and following the neck is a threaded extension upon which a threaded key cap is screwed on, as shown in Fig. 6.

The middle member is provided with a longer threaded extension 40 as shown in Fig. 7 about which is screwed, a hollow shaft 42 extending upwardly through the cover portion 28 to a point above the level of the floor boards in the operator's compartment of the vehicle, as shown in dotted lines in Fig. 2. The upper extremity of the shaft is provided with a handle 44, as shown in Fig. 7. The shaft 42 may be fixedly secured to the threaded extension 40 by means of pins or bolts 46, as indicated by the respective positions of the pins or bolts 46 as shown in Fig. 7.

The shaft and its associated members 36 and 38 are slidable axially for a short distance. This provision enables the operator to withdraw all the keys or members 36 from their respective key seats 32 thereby allowing the gear wheels to rotate in raised position as shown in Fig. 7. Rotation of the handle 44 will cause the central gear wheel to rotate and impart rotation to all the gear wheels.

Surrounding the shaft 42 is a sleeve or tube 48, which extends from the cover portion 28 up to and through a steel floor board bracket 50 which is shaped to be on the same level as the floor boards. This bracket is secured to the inside of frame members of the chassis as best shown in Fig. 6, and assists in rigidifying the whole mechanism.

Disposed around the aperture in the bracket through which the sleeve 48 extends is a collar 52 provided with diametrical key handle seats 54 as best shown in Fig. 8. The upper end of the tube 48 is provided with key handle seats 54 corresponding in position to the key handle seats in the collar 52. When the handle 44 is lowered it may be pressed or dropped in these recesses to lie practically flush with the floor board level as indicated in Fig. 6. When it is in such position, it indicates to the operator that the key members 36 are all disposed within their key seats.

It also indicates to the operator that when the key members 36 are all disposed within their respective key seats that the mechanism is locked.

In Fig. 11 I have shown a modification of my invention wherein only one end of bumping extensions are extendible and retractible with respect to the motor vehicle. The chassis is shown in dotted lines supporting a fixed bumper. This extensible and retractible device may be used to extend rods or rack bars, to either front or rear of every type of motor vehicle, by means of pointing front ends of rods or so called rack bars to either front or rear of vehicle.

With particular reference to Fig. 11, which provides bumping extension to either end of vehicle, note the increased number in gear wheels. Therefore by decreasing the number in gear wheels this same invention will extend or retract only one rack bar or rod. This form may be installed to operate with the aid of an extensible bumper, bar, or rod instead of the fixed bumper, rod, bar, or ornamental rod serving a bumping purpose on a pair of rods as shown in Fig. 1. This form may also be used to front and rear or either to front or rear of every type of motor vehicle, or for other things. The said form may be connected to operate in the center, or to either side of a motor vehicle.

The operation of the mechanism is readily perceived from the description above. The operator raises the handle above the floor board level as high as possible and rotates the handle. The raising motion unlocks all the gear wheels and the rotative motion imparts rotation to all the gear wheels which in turn extend or retract the rack bars, or rods 14.

And upon directing key handle 44 into any selected key handle seat 54 in the collar 52, and by pressing it down as far as possible into the key seat 54, the keys 36 then automatically fall within their respective key seats 32 to lock the gear wheels against rotation. Thus when the bumping extensions are in extended position, they are locked in position and cannot be collapsed against the vehicle.

This extends the length and reserves the space over which the bumping extensions extend for turning purposes when it is desired to leave the parking space. The extendible and retractible bumping extensions may also be used for a luggage rack.

My invention in extensible and retractible device for bumping extensions may be operated mechanically by installing a timed electric motor on the upper extremity of the shaft 42, instead of a handle 44, for manual operating.

Having illustrated several preferred forms of my invention various modifications will be apparent to those skilled in the art and for that reason I do not intend to limit myself only within the illustrated forms. Therefore;

I claim:

1. In combination with a vehicle, a bumper, a rack bar extending from said bumper and adapted upon reciprocation to extend and retract said bumper, a gear wheel operatively engaging said rack bar, a manually operable member operatively coupled with said gear wheel to rotate the same, said member being shiftably mounted and adapted in one position to rotate said gear wheel and in another position to lock the gear wheel against rotation.

2. In a vehicle, an element adapted to be extended and retracted from an end of the vehicle, means connected to said element extending below an occupant compartment in the vehicle, manual control means extending from said compartment to said connecting means and operatively coupled therewith to extend and retract said element, said manual control means being longitudinally slidable to two positions and adapted in one position to adjust the extension of said element and in the other position to lock said element in adjusted position.

3. In a passenger vehicle, a chassis, gears and rack bars supported by said chassis, said rack bars engaging with said gears and extending therefrom to the opposite ends of the vehicle, bumpers carried on the extremities of said rack bars, and manual control means for operating said gears extending therefrom into a passenger compartment in the vehicle, said manual means being shiftably mounted and adapted in one position to rotate said gears and in another position to lock said gears against rotative movement, and brackets secured to said chassis adapted to support said rack bars for slidable movement.

4. In a vehicle, a plurality of gear wheels, a plurality of rack bars interengaging with said gear wheels and extending therefrom toward the opposite ends of the vehicle, said gear wheels and rack bars operatively associated together and adapted to operate in unison, means for operating said gear wheels and rack bars, a plurality of locking devices each operatively associated with one of said gear wheels to prevent the rotation of said gear wheels, and means connecting said devices into a unitary structure and controllable as a unit to permit the gear wheels and their associated rack bars to operate.

5. In a vehicle, a bumper, means secured to said bumper and operable to extend or retract the bumper relative to the vehicle, a gear wheel operatively engaging said means and adapted upon rotation to cause the extension and retraction of said bumper, means for rotating said gear wheel including a shaft slidable through said gear wheel, locking means adjacent said gear wheel, said shaft adapted in its slidable movement to be engaged by said locking means and held thereby against rotation whereby said gear wheel is likewise locked against rotation.

6. In a vehicle, a gear box extending transversely of the vehicle having a plurality of gear wheel seats and a plurality of gear wheels each of which is seated in one of said seats for rotation therein, a plurality of lugs on said gear box adapted to extend over each of said gear wheels and lock the same against removal in their respective gear seats, a plurality of rack bars engaging said gear wheels, bumpers secured to said rack bars and bodily shiftable relative to the vehicle as the rack bars are reciprocated by the rotation of said gear wheels, means for rotating said gear wheels, a key seat associated with each of said gear wheel seats, a key member slidable through each of said gear wheels and adapted to seat in the key seat associated therewith and lock its respective gear wheel against rotation, and means connecting all of said key members together whereby they may be inserted and withdrawn from said key seats as a unit.

7. In a vehicle, a support, a plurality of gear wheels carried by said support, a plurality of rack bars engaging said gear wheels, bumpers secured to said rack bars and bodily shiftable relative to the vehicle as the rack bars are reciprocated by the rotation of said gear wheels, means for rotating said gear wheels, a member slidable through each of said gear wheels and keyed thereto for rotation therewith, locking means engageable with each of said key members in one position of their slidable movement to lock the same and their associated gear wheels against rotation, and means connecting said key members together for slidable movement through said gear wheels as a unit.

8. In combination with a vehicle, a bumper at an end thereof, means supporting said bumper for extensible and retractible movement relative to said end of the vehicle, a rack bar connected to said bumper, a gear wheel operatively engaging said rack bar, a rotatable operating member for rotating said gear wheel to cause the extension and retraction of said bumper, said member being axially movable and adapted in one position of its axial movement to lock said gear wheel against rotation whereby said rack bar and associated bumper may be locked in a plurality of positions relative to said end of the vehicle.

9. In a vehicle having a compartment and a floor in said compartment, a bumper at an end of the vehicle, a rack bar connected to said bumper and extending inwardly of the vehicle below said passenger compartment, a gear wheel engaging said rack bar, a rotatable control member for operating said gear wheel having a part thereof projecting upwardly through the floor of the compartment, said control member being longitudinally slidable and carrying an operating handle at the upper end thereof which in one position of its longitudinal movement lies substantially flush with the floor of the compartment and in another position of its longitudinal movement is raised above the floor of the compartment, and means adapted to engage said control member in a lower position of its longitudinal movement to lock the same against rotation whereby the gear wheel and rack bar associated therewith are locked in adjusted position.

10. In a vehicle, a rack bar mounted for movement so that it may be projected from the vehicle, said rack bar provided with a series of teeth on two sides thereof, a pair of gear wheels each operatively engaging a toothed side of said rack bar, a member slidable through each of said gear wheels, but keyed thereto for joint rotation, means for engaging said members in one position of their movement and locking the same and their respective gear wheels against rotation, and means connecting said members together for joint slidable movement.

11. In a vehicle, a rack bar mounted for movement so that it may be projected from the vehicle, said rack bar provided with a series of teeth on two sides thereof, a gear wheel engaging one of the toothed sides of said rack bar, a second gear wheel engaging the other toothed side of the rack bar, separate means for engaging each gear wheel to lock the same against rotation, and means connecting said separate locking means together for joint locking and unlocking action.

12. In a vehicle, bumpers at the opposite ends thereof, a device for projecting and retracting said bumpers relative to the ends of the vehicle including means extending to the bumpers for this purpose, means for operating said device including a member slidable and adapted in one position of this movement to be in readiness to operate the device, and means operable upon movement of said member to another position of its slidable movement to lock the same and associated bumpers in adjusted position, said device upon operation either extending or retracting said bumpers simultaneously.

13. In a vehicle, a bumper, a device for extending and retracting said bumper relative to the vehicle, said device including a gear wheel having an axial hole therein, a member slidably keyed in the hole of said gear wheel, said member in one position of its slidable movement being rotatable with said gear wheel and in another position of its slidable movement being held against rotation whereby said gear wheel is also held against rotation.

14. In a vehicle, a series of cooperating gear wheels, a plurality of rack bars interengaging with said series of gear wheels and adapted to be extended and retracted by the same, bumpers on the ends of said rack bars adapted to be extended and retracted by the same, means for rotating said gear wheels, and means adapted to lock each of said gear wheels against rotation, each of said last mentioned means being coupled together so as to be movable to locking and unlocking position as a unit.

15. In a vehicle having a compartment and a floor in said compartment, a bumper, means supporting said bumper for extensible and retractible movement relative to an end of the vehicle, mechanism below the level of the floor of said compartment for extending and retracting said bumper, a manual control member in said compartment having a part extending through said floor for mechanical operative connection with said mechanism, said control member being movable from a position projecting above the floor of said compartment to a position lying substantially flush with the floor of the compartment and adapted in either position to be in mechanical connection with said mechanism, and means for engaging said control member when it is substantially flush with the floor and preventing control operating movements thereof whereby the control member, by virtue of its connection to said mechanism, locks the latter and the bumper in adjusted position.

16. In a vehicle having a compartment, a bumper at an end of the vehicle, a device having the dual function of either operating said device to move said bumper or locking the device to prevent movement of the bumper, said device including an operating member projecting into said compartment, said member being mounted so that it may project variable distances into the compartment and adapted in one position of its projectible movement to be in readiness to operate said device to move said bumper, and means operable upon movement of said member to another position of its projectible movement to lock said device and the bumper associated therewith in adjusted position.

17. In a vehicle, a bumper at one end thereof, a rack bar attached to said bumper and adapted upon reciprocal movement to extend and retract the bumper relative to the end of the vehicle, a gear wheel meshing with the teeth on said rack bar and operable upon rotation to reciprocate said rack bar, a housing for said gear wheel having aligned openings in the opposite side walls through which said rack bar extends, the section of said rack bar intermediate the housing and the bumper having a bend therein greater than the opening in the adjacent wall of the housing so that when the rack bar is retracted the bent portion thereof abuts the side wall of the housing and thus limits the retractible movement of the rack bar.

CATHERINE DRUDE.